(12) United States Patent
Zhang et al.

(10) Patent No.: US 11,985,917 B1
(45) Date of Patent: May 21, 2024

(54) SOWING DEVICE CHANGING DEPTH OF WHEAT SOWING

(71) Applicant: Anhui Agricultural University, Hefei (CN)

(72) Inventors: Haipeng Zhang, Hefei (CN); Wenjin Ding, Hefei (CN); Zhaoliang He, Hefei (CN); Han Zheng, Hefei (CN); Lijuan Zhou, Hefei (CN)

(73) Assignee: Anhui Agricultural University, Hefei (CN)

( * ) Notice: Subject to any disclaimer, the term of this patent is extended or adjusted under 35 U.S.C. 154(b) by 0 days.

(21) Appl. No.: 18/531,972

(22) Filed: Dec. 7, 2023

(30) Foreign Application Priority Data

Jul. 12, 2023 (CN) .......................... 202310850155.3

(51) Int. Cl.
| | | |
|---|---|---|
| *A01C 7/06* | (2006.01) | |
| *A01C 5/04* | (2006.01) | |
| *A01C 7/18* | (2006.01) | |
| *A01C 7/20* | (2006.01) | |

(52) U.S. Cl.
CPC .................. *A01C 7/06* (2013.01); *A01C 5/04* (2013.01); *A01C 7/18* (2013.01); *A01C 7/208* (2013.01)

(58) Field of Classification Search
CPC .... A01C 7/06; A01C 5/04; A01C 7/18; A01C 7/208; A01C 7/00; A01C 5/00; A01C 7/20

See application file for complete search history.

(56) References Cited

FOREIGN PATENT DOCUMENTS

| | | |
|---|---|---|
| CN | 106717203 A | 5/2017 |
| CN | 114557170 A | 5/2022 |

*Primary Examiner* — Christopher J. Novosad
(74) *Attorney, Agent, or Firm* — Jeenam Park (57) ABSTRACT

A sowing device changes a depth of wheat sowing includes an external skeleton, where one side of the external skeleton is fixedly connected with a connection part for articulated with a tractor; a main board slidably connected to an interior of the external skeleton and a seeding unit below the main board; a support frame fixedly connected to the main board; a plow blade for slotting land rotatably connected to a bottom of the support frame; a rotary roller below the external skeleton and rotationally connected thereto. The main board is moved downwards to drive a straight toothed plate fixedly connected to the main board to move downwards; the straight toothed plate is moved upwards through a meshing effect of a gear to cause L-shaped toothed plate to move upwards to squeeze a horizontal plate to move upwards.

7 Claims, 10 Drawing Sheets

SOWING DEVICE CHANGING DEPTH OF WHEAT SOWING

CROSS-REFERENCE TO RELATED APPLICATIONS

This application claims priority to Chinese Patent Application No. 202310850155.3, filed on Jul. 12, 2023, which is hereby incorporated by reference in its entirety.

TECHNICAL FIELD

The present disclosure relates to the field of wheat sowing technologies, and in particular, to a sowing device that can change a depth of wheat sowing.

BACKGROUND

A wheat seeder is a mechanical device that uses a seeding mechanical system to plant wheat seeds in the soil.

When sowing through a wheat seeder, the wheat seeder is connected to a tractor, and when it reaches the wheat planting area, a control equipment on the tractor controls the rotation of the wheat seeder to move to the wheat planting area. The wheat seeds are introduced into a storage container of the wheat seeder, and the tractor moves with the wheat seeder to sow the wheat seeds inside the seeder on the wheat planting area.

The sowing depth of wheat is generally 3-5 cm. For different soil moisture content for wheat planting areas, the required depth of wheat sowing is different. For example, in sandy and arid areas, the sowing depth is 4-5 cm. The deeper of the wheat sowing depth is, the longer of the stem in the wheat field is, and more nutrients are required, that is, more base fertilizer needs to be applied. When adjusting the sowing depth, existing wheat seeders use fertilization first, and then start sowing after all the fertilizer is applied, the fertilization and sowing are independent of each other, and the amount of base fertilizer applied is often difficult to automatically change accordingly, which results in the inability of seeding all wheat at once, and affecting the growth of wheat.

To this end, a sowing device that can change the depth of wheat sowing is proposed.

SUMMARY

The purpose of the present disclosure is to provide a sowing device that can change the depth of wheat sowing, in order to solve the problems proposed in the background technology.

To achieve the above objectives, the present disclosure provides the following technical solution: a sowing device that can change a depth of wheat sowing, including an external skeleton, where one side of the external skeleton is fixedly connected with a connection part for articulated with a tractor;
- a main board slidably connected to an interior of the external skeleton, and a seeding unit is provided under the main board;
- a support frame fixedly connected to the main board, and a bottom of the support frame is rotatably connected with a plow blade for slotting land;
- a rotary roller provided below the external skeleton and rotationally connected to the external skeleton.

In an implementation mode of the present disclosure, the seeding unit includes a seeding box, which is fixedly connected to the external skeleton, a bottom of the seeding box is penetrated and extends out of and is fixedly connected with a channel, and a bottom of the channel is fixedly connected with a fixed barrel, the fixed barrel is rotatably connected with a quantitative barrel; the quantitative barrel is provided with quantitative grooves in a circular and equally spaced manner.

In an implementation mode of the present disclosure, a bottom of the fixed barrel is connected with a leakage tube, and a bottom of the main board is fixedly connected with a seeding frame, the leakage tube is penetrated and extends into the seeding frame and is slidably connected thereto; two symmetrically arranged soil guide discs are rotationally connected within the sowing frame, and the two symmetrically arranged soil guide discs are arranged in an inclined direction towards each other; one side of the seeding frame is fixedly connected with a soil pushing plate, and the leakage tube is located in an area between the soil guide disc and the soil pushing plate on the seeding frame.

In an implementation mode of the present disclosure, a seed pressing roller is rotatably connected between the two soil guide discs.

In an implementation mode of the present disclosure, an inner wall of the quantitative barrel is provided with a fixed tube, which is fixedly connected to an inner wall of the fixed barrel; a sponge sleeve is provided between the fixed tube and the quantitative barrel, and an inner wall of the sponge sleeve is fixedly connected with multiple liquid guide strips in a circular and equally spaced manner, the liquid guide strip is penetrated and extends out of a side wall of the fixed tube and is flexibly connected thereto.

In an implementation mode of the present disclosure, an inner wall of the quantitative groove is movably connected with an extrusion strip, one end of the quantitative barrel is fixedly connected with a fixed disc, and the fixed disc is provided with multiple chutes, and the extrusion strip is penetrated and extends out of the chute and is slidably connected thereto; the fixed disc is fixedly connected with multiple fixed blocks corresponding to the chute, and the fixed blocks are fixedly connected with a support spring, the support spring is fixedly connected to the extrusion strip.

In an implementation mode of the present disclosure, the external skeleton is fixedly connected with a cylinder, and a bottom of the cylinder is provided with a retractable air rod, a lower end of the air rod is fixedly connected to the maim board.

In an implementation mode of the present disclosure, the external skeleton is fixedly connected with a fertilizer box, a bottom of the fertilizer box is provided with an outlet; the main board is extended and fixedly connected with a conduit corresponding to the outlet, the conduit is located between the plow blade and the soil pushing plate.

In an implementation mode of the present disclosure, a side wall of the outlet is provided with a chute, and the chute is penetrated and extends out of and is slidably connected with a sliding plate, a bottom of the sliding plate is fixedly connected with a horizontal plate, an L-shaped toothed plate is provided below the horizontal plate, a control box is fixedly connected to the external skeleton, the L-shaped toothed plate is penetrated into the control box and is slidably connected thereto; one end of the L-shaped toothed plate that penetrates into the control box is meshed connection with a gear, which rotates and is connected in the control box, the gear is meshed and connected with a straight toothed plate, and a lower end of the straight toothed plate is penetrated and extends out of the main board and is slidably connected thereto, a lower end of the straight toothed plate is fixedly connected to the main board.

In an implementation mode of the present disclosure, the rotary roller is penetrated and extends out of and is rotationally connected with a soil spreading roller, the external skeleton is provided with an anti-splash plate at one end of the outer skeleton near the soil spreading roller, and a conveyor belt is connected between the soil spreading roller and the quantitative barrel.

Compared with the prior art, the beneficial effects of the present disclosure are as following.

1. In the present disclosure, the straight toothed plate fixed connected to the main board is driven to move downwards by a downward movement of the main board. The straight toothed plate is moved upwards through a meshing effect of the gear, and the L-shaped toothed plate is moved upwards to compress the horizontal plate, thereby increasing the outlet and correspondingly increasing an outflow rate of the base fertilizer. That is, the sowing depth of the wheat is deeper, more nutrients are required, and more base fertilizer is required; and thus, promoting a smooth growth of wheat seeds.

2. In the present disclosure, the device is driven to move through the connection part of the tractor. When the plow blade on the device is moved, it goes deep into the wheat planting area to slot the wheat planting area. The base fertilizer in the fertilizer box falls through the outlet at the bottom of the fertilizer box, and through the conduit, it falls into the slot slotted by the plow blade, thereby applying the base fertilizer to the slot.

3. In the present disclosure, a plow blade is used to slot a slot with a depth of 5-7 cm. When the device is moved, the soil guide disc and the soil pushing plate are moved in the slot. The two sides of the soil pushing plate are designed to tilt outward. When the soil pushing plate is moved in the slot, it will scrape off the soil on the side wall of the slot. The soil scraped off by the soil pushing plate will fall into the pit and cover the base fertilizer inside the pit. When the soil pushing plate is moved, the bottom of the soil pushing plate will flatten and compress the soil that falls on the base fertilizer inside the pit. The bottom of the soil pushing plate is designed with a height difference of 2 cm compared to the bottom of the plow blade. Therefore, when spreading and squeezing the soil on the base fertilizer in the pit, a soil adhesion thickness on the base fertilizer is 2 cm. This prevents a direct contact between the base fertilizer and wheat seeds in slot during subsequent processes to render it is easy for wheat seeds to burn. Therefore, the 2 cm thick soil on the base fertilizer is compressed and flattened, which can increase the soil density between the base fertilizer and wheat seeds, thereby suppressing an expansion rate of fertilizer in the soil and providing nutrients to wheat seeds for a longer period of time.

4. In the present disclosure, the seed coating solution is flowed from the seed coating box into the fixed tube through the seed coating tube, and continuously supplies the seed coating solution to the sponge sleeve through a liquid guide strip. The sponge sleeve absorbs a sufficient amount of seed coating solution, and the liquid guide strip plays a role in continuously conveying the seed coating solution from the fixed tube to the sponge sleeve. At the same time, the liquid guide strip is served as a connector to fix the sponge sleeve and the fixed tube together and cannot rotate.

5. In the present disclosure, the soil spreading roller of the device is rotated through the movement of the device. The soil spreading roller is rotated through a quantitative barrel connected to a conveyor belt, and the seeds in the seeding box enter and accumulate in the channel. When the quantitative barrel is rotated, the quantitative groove on the quantitative barrel is rotated synchronously. When the quantitative groove passes through the channel area, the wheat seeds in the channel enter the quantitative groove, and when the quantitative groove rotates and leaves, the wheat seeds piled up on the quantitative groove will be squeezed by the sidewall of the channel, causing wheat seeds that are not in the quantitative groove to remain in the channel. This way, the number of wheat seeds left in the quantitative groove is roughly the same each time, so that the wheat seeds that eventually fall from the quantitative groove will fall quantitatively into the slot slotted by the plow blade on the soil.

6. The present disclosure is based on the fact that the quantitative grooves are spaced provided on the quantitative barrel at equal interval, and the rotation speed of the quantitative barrel is consistent with the rotation speed of the soil spreading roller connected through the conveyor belt. The rotation speed of the soil spreading roller is related to the tractor connected to the device, that is, the movement speed of the tractor is compatible with the rotation speed of the quantitative barrel, that is, the movement speed of the tractor can make the quantitative barrel rotate quickly or slowly accordingly, the movement speed of the tractor corresponds to the displacement on the wheat planting land, and the rotation speed of the quantitative barrel corresponds to the spacing between the wheat seeds that fall on the wheat planting land. The two are adapted so that regardless of the movement speed of the tractor, the spacings between the wheat seeds that fall on the wheat planting land are always the same so as to prevent uneven planting of seeds on the wheat planting land due to changes in the movement speed of the tractor.

7. In the present disclosure, wheat seeds enter the quantitative barrel, and the other side of the quantitative barrel is provided with a sponge sleeve that absorbs the seed coating liquid. After entering the quantitative barrel, the wheat seeds come into contact with the sponge sleeve, causing the seed coating liquid to attach to the wheat seeds. The rotation of the quantitative groove drives the wheat seeds in the quantitative groove to rotate. Since the sponge sleeve does not rotate, the wheat seeds in the quantitative groove continuously are moved on the sponge sleeve, thereby adhering to more seed coating liquid, so as to protect wheat seeds and reduce the impact of pests on them in the soil.

8. In the present disclosure, the inner wall of the fixed barrel can perform roughen processing. When the quantitative groove where the wheat seeds are located is moved in the fixed cylinder, due to the roughness of the inner wall of the fixed barrel, the wheat seeds are subjected to greater friction when connecting the inner wall of the fixed barrel. Therefore, when the quantitative groove drives the wheat seeds to rotate, the wheat seeds themselves will be more easily rotated and moved on the sponge sleeve, enabling the wheat seeds to attach to the seed coating liquid more comprehensively, the depth of the quantitative groove is slightly smaller than the diameter of the wheat seed, which allows the wheat seed to be squeezed by the inner wall of the fixed tube into the sponge sleeve when the quantitative groove containing the wheat seed rotates to an area of the fixed tube, allowing the wheat seed to attach more seed coating liquid and achieve better pest control effects.

9. In the present disclosure, the quantitative groove drives the wheat seeds to rotate into the fixed barrel, causing the wheat seeds to be squeezed by the inner wall of the fixed barrel, causing the extrusion strip to move inward and squeeze the sponge sleeve, causing it to precipitate seed coating liquid, further promoting the pest prevention treatment of wheat seeds.

10. In the present disclosure, wheat seeds are moved to the outlet of the leakage tube driven by the movement of the quantitative groove, the seeds in the quantitative groove fall into the leakage tube and eventually fall into the slot slotted by the plow blade. At this time, the extrusion strip loses the limit of the inner wall of the fixed barrel and rebounds under the action of the support spring to promote the complete fall of the wheat seeds in the quantitative groove and prevent the wheat seeds from sticking and remaining in the quantitative groove.

11. In the present disclosure, the movement of the soil guide disc to scrape the soil on both sides of the slot into the slot after the wheat seeds fall into the slot slotted by the plow blade, and the seed pressing roller compresses the wheat seeds to ensure that they are well distributed in the slot and promote better growth of the wheat seeds.

12. In the present disclosure, the cylinder is started, which drives the main board to move up and down through the air rod, thereby driving the soil pushing plate and plow blade connected to the main board to move up and down, thereby changing the fertilization depth of the base fertilizer and the sowing depth of the wheat seeds.

Numeral reference: 1. external skeleton; 11. connection part; 12. main board; 13. support frame; 14. plow blade; 15. rotary roller; 2. seeding unit; 21. seeding box; 22. channel; 23. fixed barrel; 24. quantitative barrel; 25. quantitative groove; 26. conveyor belt; 3. leakage tube; 31. seeding frame; 32. soil guide disc; 33. Soil pushing plate; 4. seed pressing roller; 5. fixed tube; 51. seed coating tube; 52. seed coating box; 53. sponge sleeve; 54. liquid guide strip; 6. extrusion strip; 61. fixed disc; 62. chute; 63. fixed block; 64. support spring; 7. cylinder; 71. air rod; 8. fertilize box; 81. outlet; 82. conduit; 9. horizontal plate; 91. sliding plate; 92. control box; 93. L-shaped toothed plate; 94. straight toothed plate; 100. soil spreading roller; 101. anti-splash plate.

DESCRIPTION OF EMBODIMENTS

The following will provide a clear and complete description of the technical solution in the embodiments of the present disclosure, in combination with the drawings. Obviously, the described embodiments are only a part of the embodiments of the present disclosure, not all of them. Based on the embodiments in the present disclosure, all other embodiments obtained by ordinary technicians in the art without creative work fall within the protection scope of the present disclosure.

Figure 1:
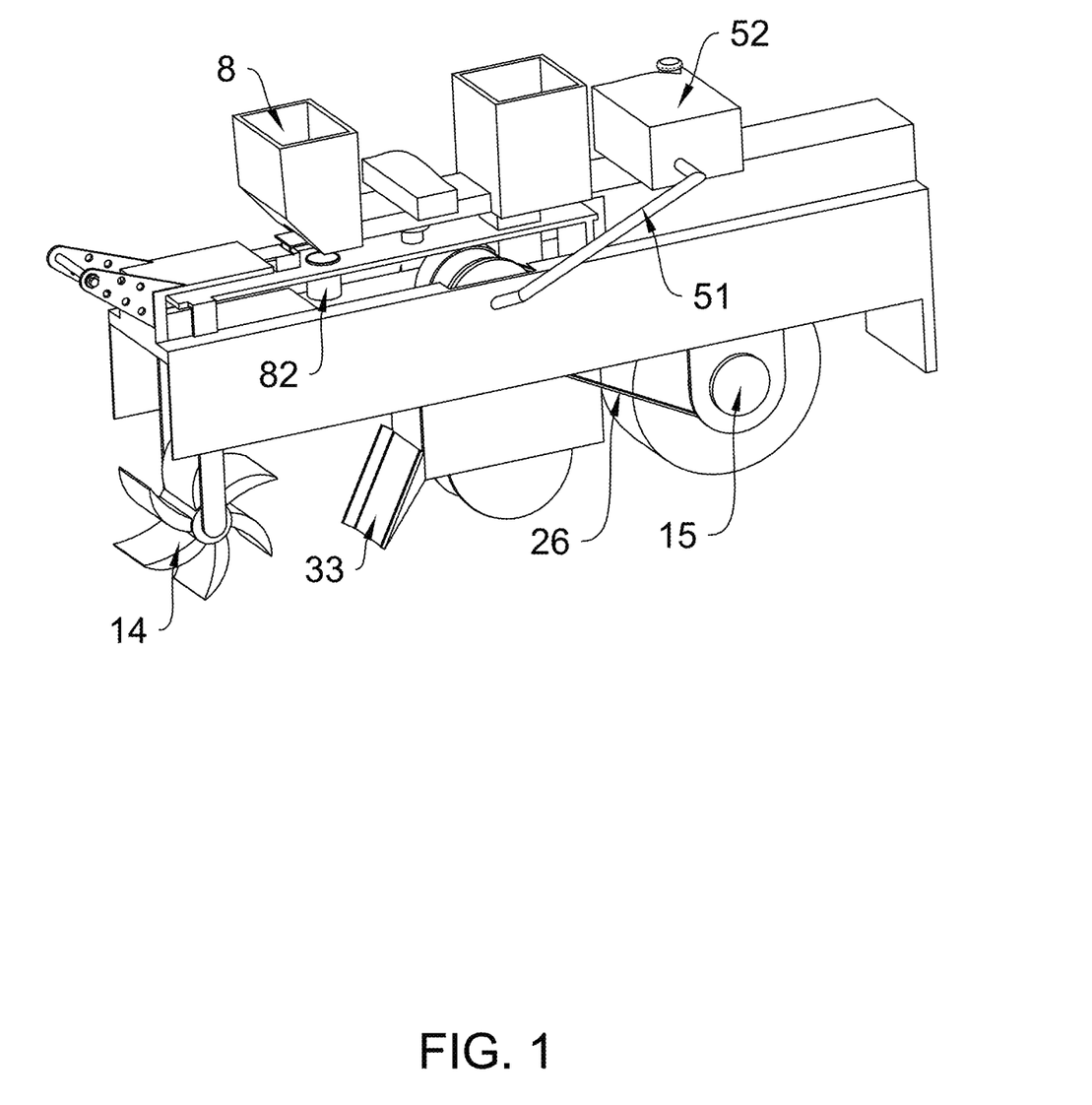
FIG. 1 is an overall structural view of the present disclosure.
Figure 2:
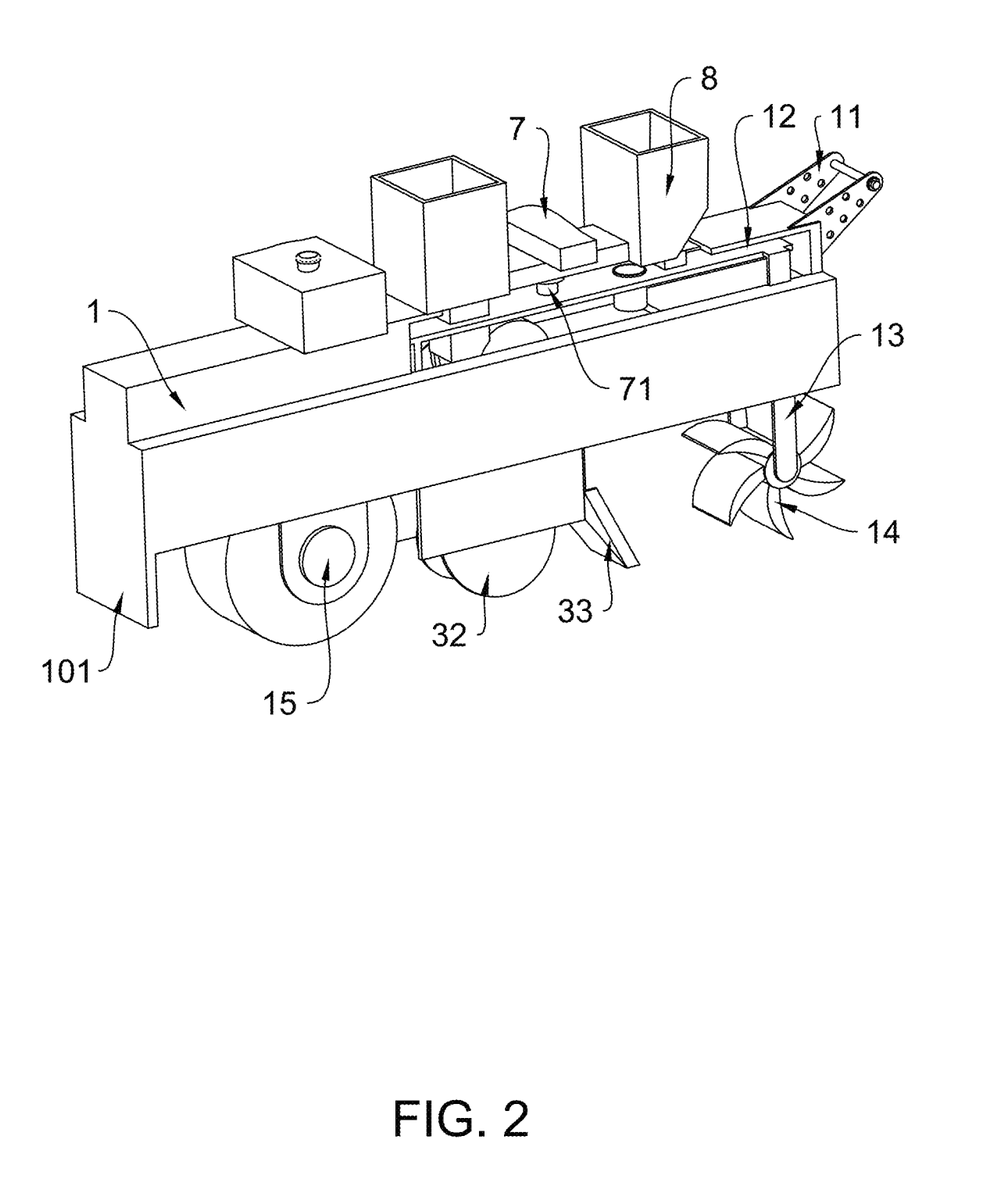
FIG. 2 is a rear view of the overall structure of the present disclosure.
Figure 3:
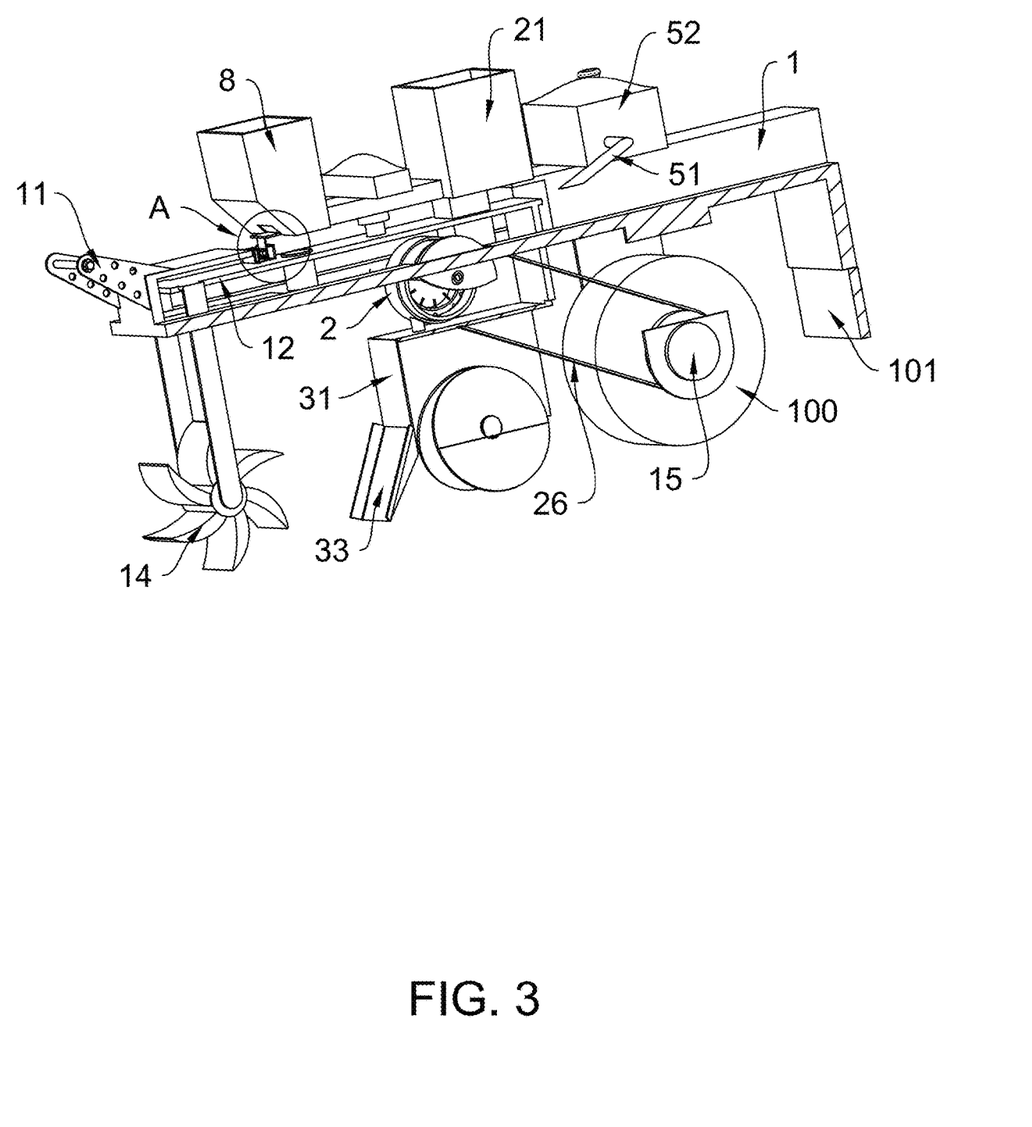
FIG. 3 is an internal structural view of the present disclosure.
Figure 4:
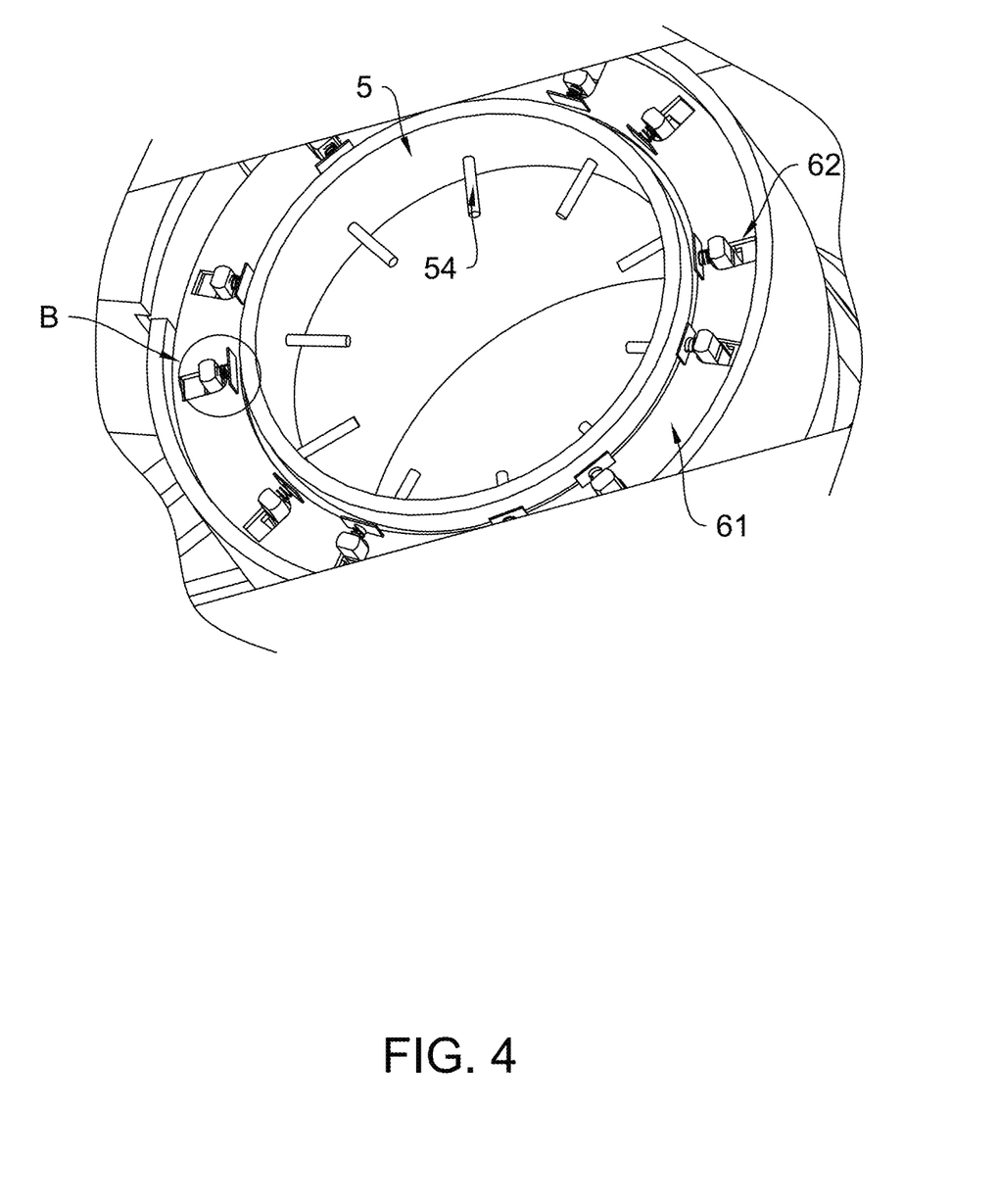
FIG. 4 is a structural view of a back side of a fixed tube of the present disclosure.
Figure 5:
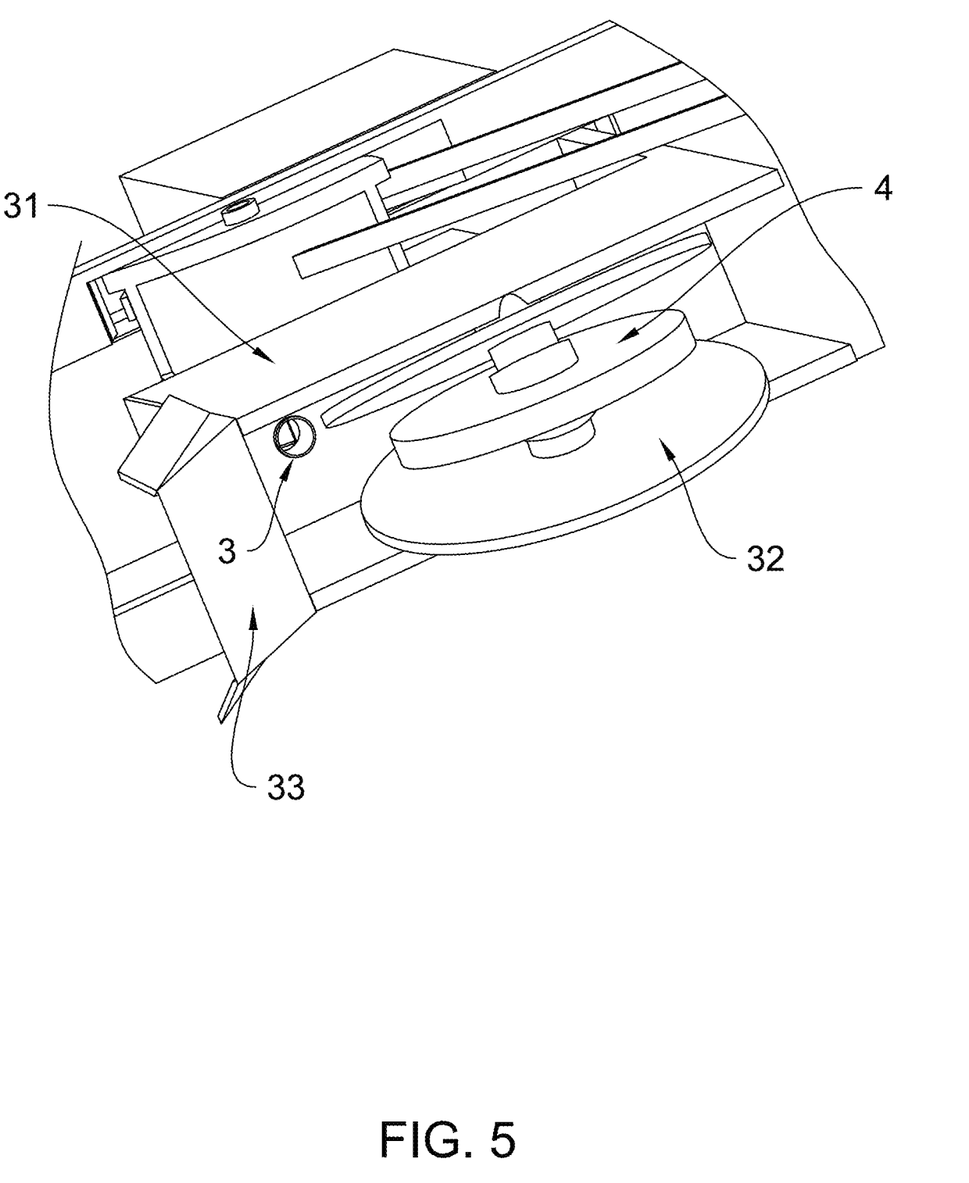
FIG. 5 is a structural view within a seeding frame of the present disclosure.
Figure 6:
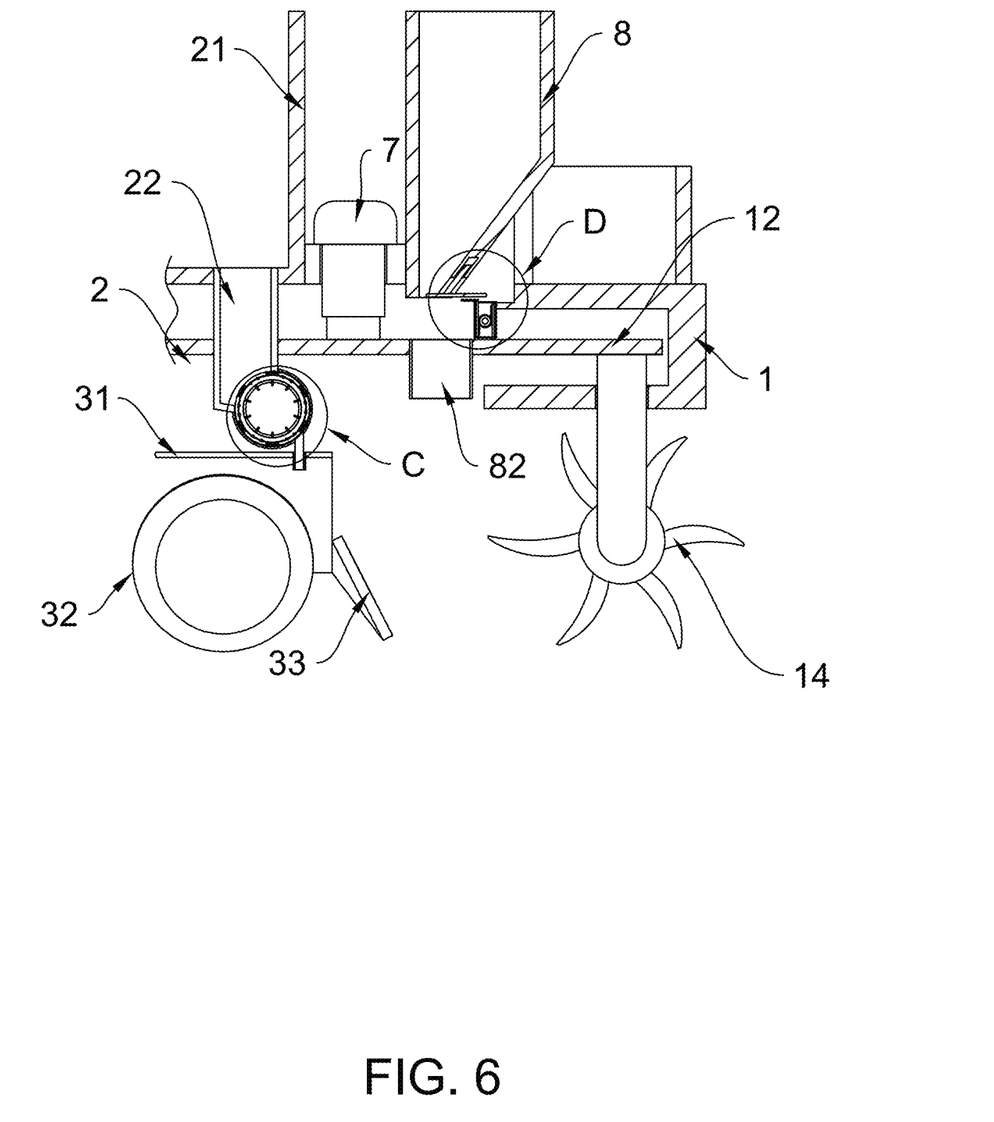
FIG. 6 is a front view of a partial of the present disclosure.
Figure 7:
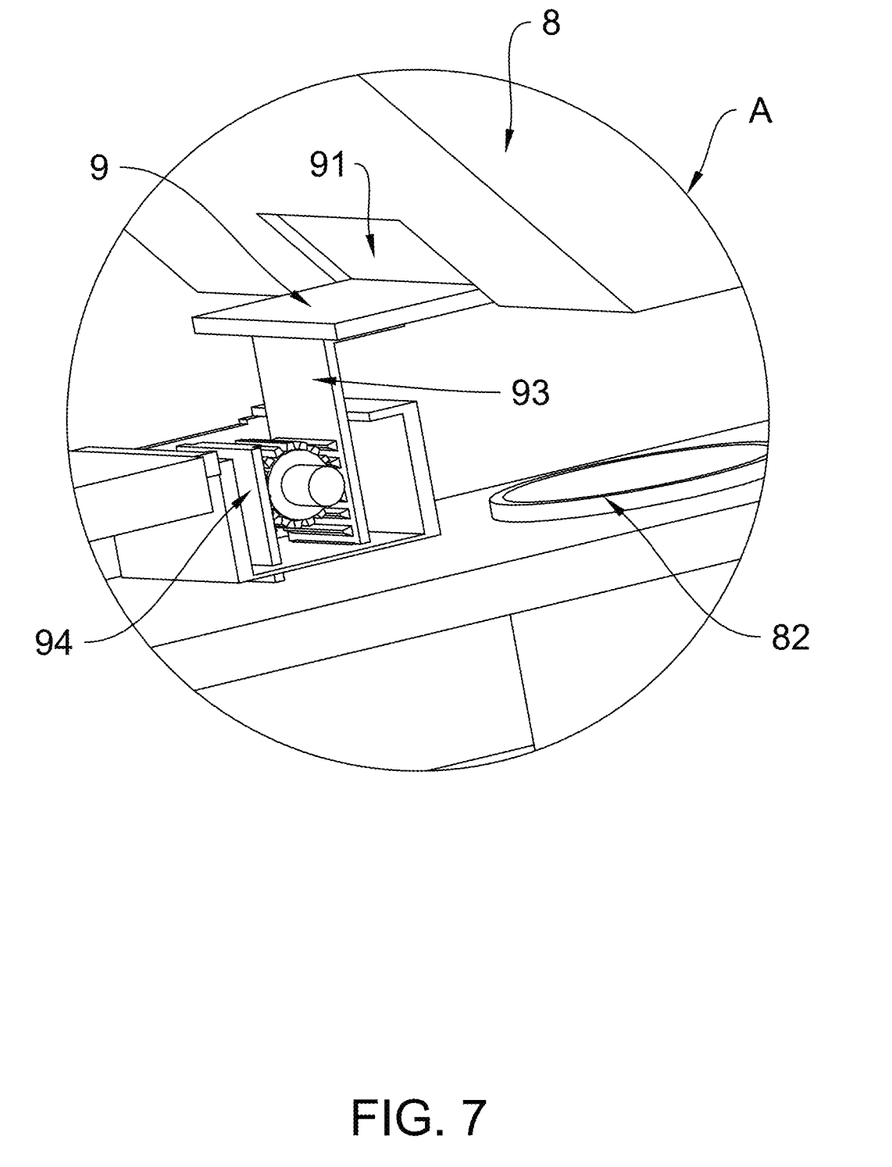
FIG. 7 is an enlarged view of position A in FIG. 3 of the present disclosure.
Figure 8:
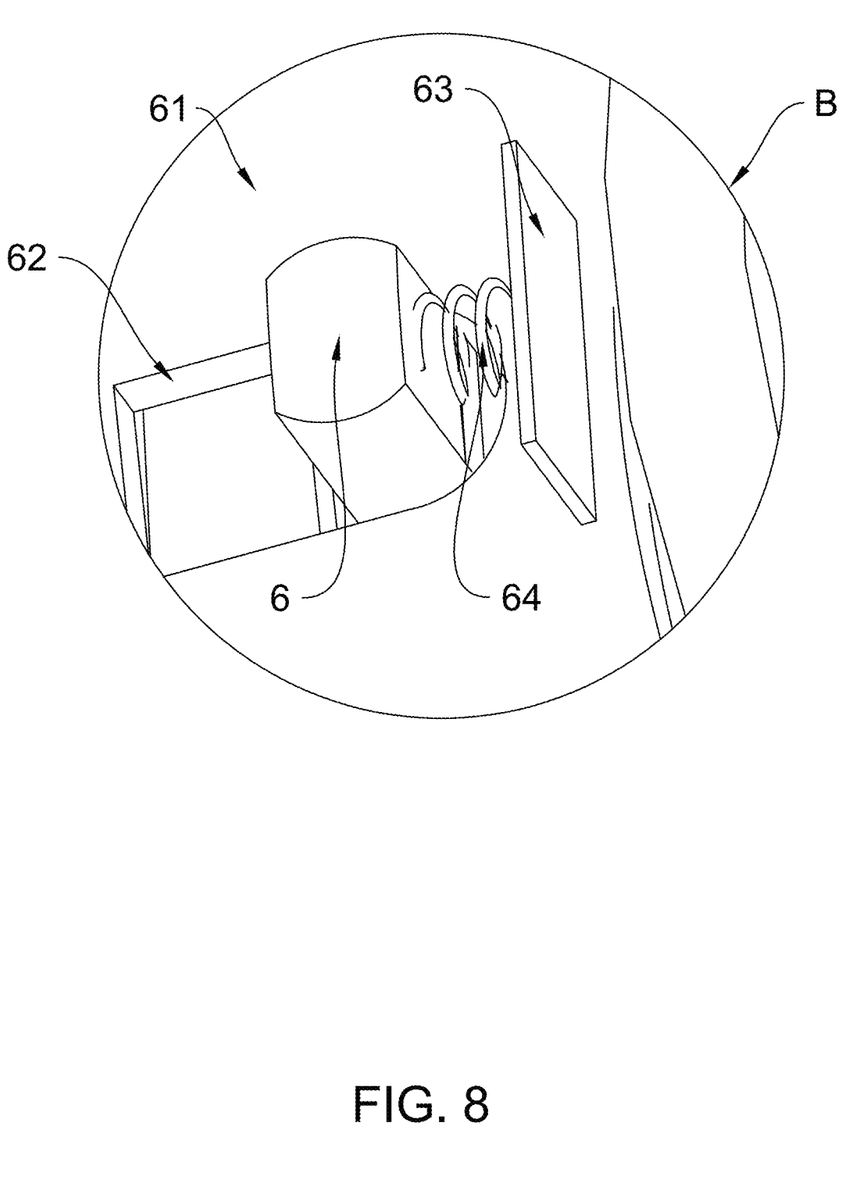
FIG. 8 is an enlarged view of position B in FIG. 4 of the present disclosure.
Figure 9:
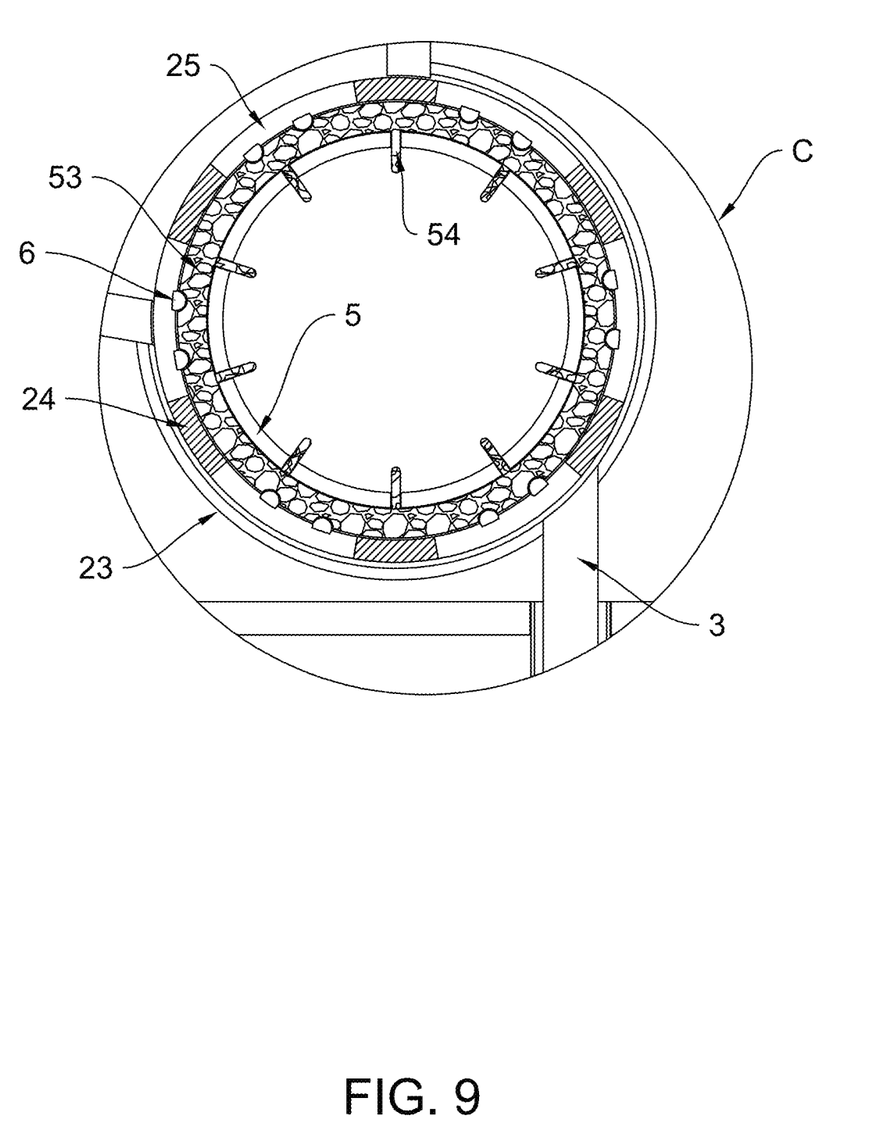
FIG. 9 is an enlarged view of position C in FIG. 6 of the present disclosure.
Figure 10:
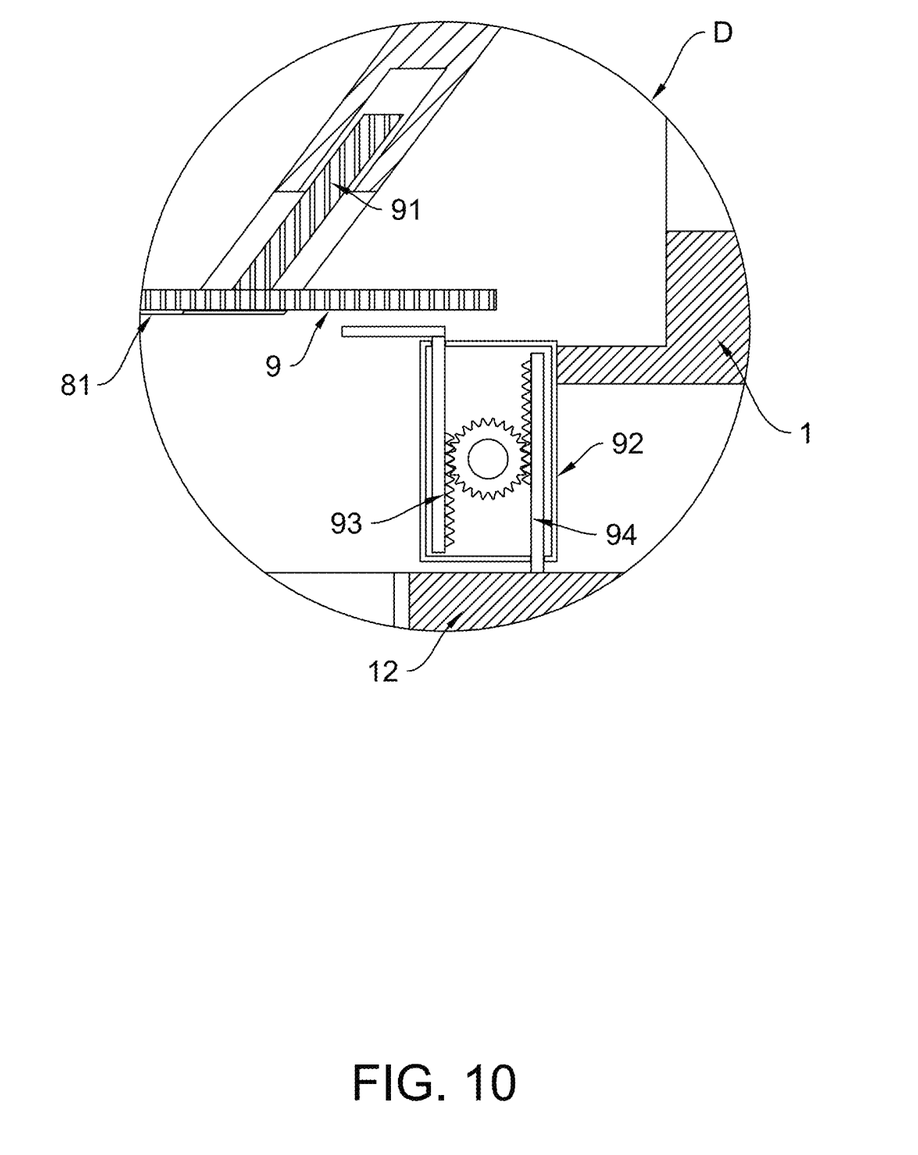
FIG. 10 is an enlarged view of position D in FIG. 6 of the present disclosure.

Please refer to FIGS. 1 to 10. The present disclosure provides a technical solution:
a sowing device that can change a depth of wheat sowing, including an external skeleton 1, where one side of the external skeleton 1 is fixedly connected with a connection part 11 for articulated with a tractor;
a main board 12 slidably connected to an interior of the external skeleton 1, and a seeding unit 2 is provided under the main board 12;
a support frame 13 fixedly connected to the main board 12, and a bottom of the support frame 13 is rotatably connected with a plow blade 14 for slotting land;
a rotating roller 15 provided below the external skeleton 1 and rotatably connected to the external skeleton 1.

As an embodiment of the present disclosure, the seeding unit 2 includes a seeding box 21, which is fixedly connected to the external skeleton 1. A bottom of the seeding box 21 is penetrated and extends out of and is fixedly connected with a channel 22, and a bottom of the channel 22 is fixedly connected with a fixed barrel 23. The fixed barrel 23 is internally rotatably connected with a quantitative barrel 24, and quantitative grooves 25 are arranged on the quantitative barrel 24 in a circular and equally spaced manner.

When working, an inner wall of the fixed barrel 23 can be subjected to be roughened processing. When the quantitative groove 25 where the wheat seeds are located is moved in the fixed barrel 23, a rough inner wall of the fixed barrel 23 causes greater friction is subjected by the wheat seeds when the wheat seeds contact the inner wall of the fixed barrel 23. Therefore, when the quantitative groove 25 drives the wheat seeds to rotate, the wheat seeds themselves will be more easily rotated and moved on a sponge sleeve 53, which can make the wheat seeds more fully adhere to a seed coating liquid. A depth of quantitative groove 25 is slightly smaller than a diameter of wheat seed, which allows the wheat seeds to be squeezed into a sponge sleeve 53 by an inner wall of the fixed barrel 23 when the quantitative groove 25 containing wheat seeds rotates to an area of the fixed barrel 23. As a result, the wheat seeds can attach with more seed coating liquid, achieving better pest control effects.

When the quantitative groove 25 drives the wheat seeds to move to an opening of the leakage tube 3, the seeds in the quantitative groove 25 fall into the leakage tube 3 and eventually fall into a slot slotted by the plow blade 14. At this time, an extrusion strip 6 loses the limit of the inner wall of the fixed barrel 23 and rebounds under an action of the support spring, which promotes all the wheat seeds in the quantitative groove 25 to fall and preventing the wheat seeds from sticking and remaining in the quantitative groove 25.

As an embodiment of the present disclosure, a bottom of the fixed barrel 23 is connected with a leakage tube 3, and a bottom of the main board 12 is fixedly connected with a seeding frame 31. The leakage tube 3 runs through and extends into the seeding frame 31 and is slidably connected to the seeding frame 31. The seeding frame 31 is rotationally connected with two symmetrically arranged soil guide discs 32, the two symmetrically arranged soil guide discs 32 are inclined in opposite directions, one side of the seeding frame 31 is fixedly connected with a soil pushing plate 33, and the leakage tube 3 is located in an area between the soil guide disc 32 and the soil pushing plate 33 on the seeding frame 31.

When working, the depth of the slot slotted by the plow blade 14 is 5-7 cm. When the device is moved, the soil guide disc 32 and the soil pushing plate 33 are moved in the slot. The two sides of the soil pushing plate 33 are designed to tilt outward. When the soil pushing plate 33 are moved in the slot, it will scrape off the soil on a side wall of the slot. The soil scraped off by the soil pushing plate 33 will fall into a pit and cover a base fertilizer in the pit, and when the soil pushing plate 33 is moved, a bottom of soil pushing plate 33 is used to flatten and compress the soil that falls on the base fertilizer in the pit. A bottom of soil pushing plate 33 is designed with a height difference of 2 cm compared to a bottom of plow blade 14. Therefore, when flattening and squeezing the soil on the base fertilizer in the pit, a soil adhesion thickness on the base fertilizer is 2 cm. which avoids a direct contact between the base fertilizer in the pit and the wheat seeds that renders it easy for the wheat seeds to burn, squeezing and spreading the 2 cm thick soil on the base fertilizer can increase the soil density between the base fertilizer and wheat seeds, thereby suppressing an expansion rate of the fertilizer in the soil and providing nutrients to wheat seeds for a longer period of time.

As an embodiment of the present disclosure, a seed pressing roller 4 is rotatably connected between the two soil guide discs 32.

During work, after the wheat seeds fall into the slot slotted by the plow blade 14, the soil guide disc 32 is moved and scrapes the soil on both sides of the slot into the slot. The seed pressing roller 4 compresses the wheat seeds, allowing them to be well distributed in the slot and promoting better growth of the wheat seeds.

As an embodiment of the present disclosure, an inner wall of the quantitative barrel 24 is provided with a fixed tube 5, which is fixedly connected to the inner wall of the fixed barrel 23. A sponge sleeve 53 is provided between the fixed tube 5 and the quantitative barrel 24, and an inner wall of the sponge sleeve 53 is fixedly connected with multiple liquid guide strips 54 that are arranged in a circular and equally spaced manner. The liquid guide strips 54 are penetrated and extend out of a side wall of the fixed tube 5 and are flexibly connected to the fixed tube 5.

During work, the seed coating solution in a seed coating box 52 flows into the fixed tube 5 through the seed coating tube 51, and continuously supplies the seed coating solution to a sponge sleeve 53 through the liquid guide strip 54. The sponge sleeve 53 absorbs a sufficient amount of seed coating solution, and the liquid guide strip 54 is served to continuously transport the seed coating solution from the fixed tube 5 to the sponge sleeve 53. At the same time, the liquid guide strip 54 is served as a connector to fix the sponge sleeve 53 and the fixed tube 5 together and cannot rotate.

The wheat seeds enter the quantitative groove 25, and the other side of the quantitative groove 25 is a sponge sleeve 53 that absorbs the seed coating liquid. After the wheat seeds enter the quantitative groove 25, they come into contact with the sponge sleeve 53, which causes the wheat seeds to attach to the seed coating liquid. The rotation of the quantitative groove 25 drives the wheat seeds in the quantitative groove 25 to rotate. Since the sponge sleeve 53 does not rotate, the wheat seeds in the quantitative groove 25 are continuously moved on the sponge sleeve 53, thereby adhering to more seed coating liquid so as to protect wheat seeds and reduce the impact of pests on them in the soil.

When the quantitative groove 25 drives the wheat seeds to rotate to the fixed barrel 23, the wheat seeds are compressed by the inner wall of the fixed barrel 23, causing the extrusion strip 6 to move inward and squeeze the sponge sleeve 53, causing it to precipitate the seed coating liquid, further promoting the pest prevention treatment of the wheat seeds.

As an embodiment of the present disclosure, an inner wall of the quantitative groove 25 is movably connected with an extrusion strip 6, one end of the quantitative barrel 24 is fixedly connected to a fixed disc 61, and a plurality of chutes 62 are arranged on the fixed disc 61. The extrusion strip 6 is penetrated and extends out of the chute 62 and is slidably connected thereto. The fixed disc 61 is fixedly connected with a plurality of fixed blocks 63 that are corresponding to the chutes 62, and a support spring 64 is fixedly connected to the fixed block 63, and the support spring 64 is fixedly connected to the extrusion strip 6.

The external skeleton 1 is fixedly connected to a cylinder 7, a bottom of the cylinder 7 is provided with a retractable air rod 71. A lower end of the air rod 71 is fixedly connected to the main board 12.

During work, according to the soil moisture content of the wheat planting area, when it is necessary to adjust the sowing depth of wheat, the cylinder 7 is activated. The cylinder 7 drives the main board 12 to move up and down through the air rod 71, thereby driving the soil pushing plate 33 and plow blade 14 connected to the main board 12 to move up and down, thereby changing the fertilization depth of the base fertilizer and the sowing depth of the wheat seeds.

As an embodiment of the present disclosure, the external skeleton 1 is fixedly connected with a fertilizer box 8, a bottom of the fertilizer box 8 is provided with an outlet 81. The main board 12 is penetrated and extends out of and is fixedly connected with a conduit 82 corresponding to the outlet 81, the conduit 82 is located between the plow blade 14 and the soil pushing plate 33.

During operation, the tractor drives the device to move through the connection part 11. The plow blade 14 on the device moves deep into the wheat planting area to slot the wheat planting area. The base fertilizer in the fertilizer box 8 falls through the outlet 81 at the bottom of the fertilizer box 8, and through the conduit 82 falls into the slot slotted by the plow blade 14, thereby applying the base fertilizer to the slot.

As an embodiment of the present disclosure, a side wall of the outlet 81 is provided with a chute, which extends through and is slidably connected with a sliding plate 91. A bottom of the sliding plate 91 is fixedly connected with a horizontal plate 9, and an L-shaped toothed plate 93 is provided below the horizontal plate 9. The external skeleton 1 is fixedly connected to a control box 92, and the L-shaped toothed plate 93 is penetrated and extends into the control box 92 and is slidably connected thereto. One end of the L-shaped toothed plate 93 that penetrates through the control box 92 is meshed and connected to a gear, the gear is rotated and connected in the control box 92, and the gear is meshed and connected with a straight toothed plate 94. A lower end of the straight toothed plate 94 is penetrated and extends out of the main board 12 and is slidably connected thereto, and a lower end of the straight toothed plate 94 is fixedly connected to the main board 12.

When working, when increasing the sowing depth of wheat, the main board 12 is moved downwards to drive the straight toothed plate 94 fixedly connected to the main board 12 to move downwards. The straight toothed plate 9 drives the L-shaped toothed plate 93 to move upwards through the meshing effect of the gears, and the L-shaped toothed plate 93 is moved upwards to compress the horizontal plate 9 to move upward, thereby increasing the outlet 81 and correspondingly increasing an outflow rate of the base fertilizer.

That is to say, the wheat seeding is deeper, more nutrients are needed, and more base fertilizer is needed, which promotes a smooth growth of wheat seeds.

As an embodiment of the present disclosure, the rotatory roller 15 is penetrated and extends out of and is rotationally connected with a soil spreading roller 100. The external skeleton 1 is provided with an anti-splash plate 101 at one end of the external skeleton 1 near the soil spreading roller 100, and a conveyor belt 26 is connected between the soil spreading roller 100 and the quantitative barrel 24.

During operation, the movement of the device causes the soil spreading roller 100 of the device to rotate. The soil spreading roller 100 is rotated through the quantitative barrel 24 connected to the conveyor belt 26, and the seeds in the seeding box 21 enter and accumulate in the channel 22. When the quantitative barrel 24 rotates, the quantitative groove 25 on the quantitative barrel 24 follows the synchronous rotation. When the quantitative groove 25 passes through an area of the channel 22, the wheat seeds in the channel 22 enter the quantitative groove 25, and when the quantitative groove 25 rotates and leaves, the wheat seeds piled up on the quantitative groove 25 will be squeezed by a side wall of channel 22, which renders wheat seeds are not in the quantitative groove 25 to remain in channel 22. This way, the number of wheat seeds left in the quantitative groove 25 is roughly the same each time, so that the wheat seeds that ultimately fall from the quantitative groove 25 will quantitatively fall into the slot slotted by the plow blade 14 on the soil.

Due to the fact that the quantitative grooves 25 are evenly spaced on the quantitative barrel 24, and a rotation speed of the quantitative barrel 24 is consistent with a rotation speed of the soil spreading roller 100 connected through the conveyor belt 26, and a rotation speed of the soil spreading roller 100 is related to the tractor connected to the device, that is, a movement speed of the tractor is compatible with the rotation speed of the quantitative barrel 24, that is, a movement speed of the tractor can cause a corresponding quick or slow rotation speed of the quantitative barrel 24, the movement speed of the tractor corresponds to the displacement on the wheat planting land, and the rotation speed of the quantitative barrel 24 corresponds to the spacing between the wheat seeds that fall on the wheat planting land. The two are adapted so that regardless of the movement speed of the tractor, the spacings between the wheat seeds that fall on the wheat planting land are always the same, so as to prevent the uneven planting of seeds on the wheat planting land caused by changes in the movement speed of the tractor.

Working principle: a sufficient amount of base fertilizer is poured into the fertilizer box 8, a sufficient amount of high-quality wheat seeds is poured into the sowing box 21, and a sufficient amount of prepared seed coating liquid is poured into the seed coating box 52. The device is connected to the tractor through the connection part 11. After the tractor transports the device to the wheat planting land, the tractor is provided with a structure to control an overall rotation of the device. After moving the device to a suitable position, the movement of the tractor drives the device to move.

The tractor drives the device to move through the connection part 11. When the plow blade 14 on the device is moved, it goes deep into the wheat planting area to slot the wheat planting area. The base fertilizer in the fertilizer box 8 falls through the outlet 81 at the bottom of the fertilizer box 8, and through the conduit 82 falls into the slot slotted by the plow blade 14, thereby applying the base fertilizer to the slot.

The depth of the slot slotted by the plow blade 14 is 5-7 cm. When the device moves, the guide plate 32 and the soil pushing plate 33 are moved in the slot. The two sides of the soil pushing plate 33 are designed to tilt outward. When the soil pushing plate 33 is moved in the slot, it will scrape off the soil on a side wall of the slot. The soil scraped off by the soil pushing plate 33 will fall into the pit and cover the base fertilizer in the pit. When the soil pushing plate 33 is moved, the bottom of the soil pushing plate 33 will flatten and compress the soil that falls on the base fertilizer in the pit, the bottom of the soil pushing plate 33 is designed with a height difference of 2 cm compared to the bottom of the plow blade 14. Therefore, when flattening and squeezing the soil on the base fertilizer in the pit, the soil adhesion thickness on the base fertilizer is 2 cm. This prevents a direct contact between the base fertilizer and wheat seeds in the slot during subsequent processes, which can easily cause wheat seeds to burn. Therefore, when flattening the 2 cm thick soil on the base fertilizer, it can increase the soil density between the base fertilizer and wheat seeds, thereby suppressing the expansion rate of fertilizer in the soil and providing nutrients to wheat seeds for a longer period of time.

The seed coating solution in the seed coating box 52 flows into the fixed tube 5 through the seed coating tube 51, and continuously supplies the seed coating solution to the sponge sleeve 53 through the liquid guide strip 54. The sponge sleeve 53 absorbs a sufficient amount of seed coating solution, and the liquid guide strip 54 plays a role in continuously conveying the seed coating solution from the fixed tube 5 to the sponge sleeve 53. At the same time, the liquid guide strip 54 is served as a connector to fix the sponge sleeve 53 and the fixed tube 5 together and cannot rotate.

The movement of the device causes the soil spreading roller 100 of the device to rotate. The soil spreading roller 100 is rotated through the quantitative barrel 24 connected to the conveyor belt 26, and the seeds in the seeding box 21 enter and accumulate in the channel 22. When the quantitative barrel 24 rotates, the quantitative groove 25 on the quantitative barrel 24 follows the synchronous rotation. When the quantitative groove 25 passes through the area of the channel 22, the wheat seeds in the channel 22 enter the quantitative groove 25, and when the quantitative groove 25 rotates and leaves, the wheat seeds piled up on the quantitative groove 25 will be squeezed by the side wall of channel 22, causing wheat seeds that are not in the quantitative groove 25 to remain in channel 22. This way, the number of wheat seeds left in the quantitative groove 25 is roughly the same each time, so that the wheat seeds that ultimately fall from the quantitative groove 25 will quantitatively fall into the slot slotted by the plow blade 14 on the soil.

Due to the fact that the quantitative grooves 25 are spaced arranged on the quantitative barrel 24 at interval, and the rotation speed of the quantitative barrel 24 is consistent with the rotation speed of the soil spreading roller 100 connected through the conveyor belt 26, and the rotation speed of the soil spreading roller 100 is related to the tractor connected to the device, that is, the movement speed of the tractor is compatible with the rotation speed of the quantitative barrel 24, that is, the movement speed of the tractor can cause the corresponding quick and slow rotation speed of the quantitative barrel 24. The movement speed of the tractor corresponds to the displacement on the wheat planting land, and the rotation speed of the quantitative barrel 24 corresponds to the spacing between the wheat seeds that fall on the wheat planting land. The two are adapted so that regardless of the movement speed of the tractor, the spacings between the wheat seeds that fall on the wheat planting land are always the same, so as to prevent the uneven planting of seeds on the wheat planting land caused by the movement speed change of the tractor.

The wheat seeds enter the quantitative groove 25, and the other side of the quantitative groove 25 is a sponge sleeve 53 that absorbs the seed coating liquid. After the wheat seeds enter the quantitative groove 25, they come into contact with the sponge sleeve 53, causing the wheat seeds to be absorbed to the seed coating liquid. The rotation of the quantitative groove 25 drives the wheat seeds in the quantitative groove 25 to rotate. Since the sponge sleeve 53 does not rotate, the wheat seeds in the quantitative groove 25 are continuously moved on the sponge sleeve 53, thereby adhering to more seed coating liquid, so as to protect wheat seeds and reduce the impact of pests on them in the soil.

An inner wall of the fixed barrel 23 can be subjected to be roughened processing. When the quantitative groove 25 where the wheat seeds are located is moved in the fixed barrel 23, due to the roughness of the inner wall of the fixed barrel 23, the wheat seeds are subjected to greater friction when the wheat seeds contact the inner wall of the fixed barrel 23. Therefore, when the quantitative groove 25 drives the wheat seeds to rotate, the wheat seeds themselves will more be easily rotated and moved on the sponge sleeve 53, which can make the wheat seeds more fully adhere to the seed coating liquid, the depth of quantitative groove 25 is slightly smaller than the diameter of wheat seeds, which allows the wheat seeds to be squeezed into the sponge sleeve 53 by the inner wall of the fixed barrel 23 when the quantitative groove 25 containing wheat seeds rotates to the area of the fixed barrel 23. As a result, the wheat seeds can attach more seed coating liquid, achieving better pest control effects.

When the quantitative groove 25 drives the wheat seeds to rotate to the fixed barrel 23, the wheat seeds are compressed by the inner wall of the fixed barrel 23, causing the extrusion strip 6 to move inward and squeeze the sponge sleeve 53, causing it to precipitate seed coating liquid, further promoting the pest prevention treatment of the wheat seeds.

When the quantitative groove 25 drives the wheat seeds to move to the opening of the leakage tube 3, the seeds in the quantitative groove 25 fall into the leakage tube 3 and eventually fall into the slot slotted by the plow blade 14 below. At this time, the extrusion strip 6 loses the limit of the inner wall of the fixed barrel 23 and rebounds under the action of the support spring 64, which promotes all wheat seeds in the quantitative groove 25 to fall and preventing the wheat seeds from sticking and remaining in the quantitative groove 25.

After the wheat seeds fall into the slot slotted by the plow blade 14, the soil guide disc 32 is moved to scrape the soil on both sides of the slot and guide it into the slot. The seed pressing roller 4 compresses the wheat seeds to ensure that they are well distributed in the slot and promote better growth of the wheat seeds.

According to the soil moisture content of the wheat planting area, when it is necessary to adjust the sowing depth of the wheat, a cylinder 7 is activated. The cylinder 7 drives the main board 12 to move up and down through an air rod 71, thereby driving a soil pushing plate 33 and plow blade 14 connected to the main board 12 to move up and down, thereby changing the fertilization depth of the base fertilizer and the sowing depth of the wheat seeds.

When increasing the sowing depth of wheat, the main board 12 is moved downwards to drive the straight toothed plate 94 fixedly connected to the main board 12 to move downwards. The straight toothed plate 94 drives the L-shaped toothed plate 93 to move upwards through the meshing effect of the gears, and the L-shaped toothed plate 93 is moved upwards to compress the horizontal plate 9, thereby increasing the outlet 81 and correspondingly increasing the outflow rate of the base fertilizer. That is, the wheat seeding is deeper, more nutrients are required, and more base fertilizer is required, which promotes the smooth growth of wheat seeds.

Although embodiments of the present disclosure have been shown and described, it can be understood by ordinary technical personnel in the art that multiple changes, modifications, substitutions, and variations can be made to these embodiments without departing from the principles and spirit of the present disclosure. The scope of the present disclosure is limited by the accompanying claims and their equivalents.

What is claimed is:

1. A sowing device that change a depth of wheat sowing, comprising:
    an external skeleton (1), one side of the external skeleton (1) is fixedly connected with a connection part (11) for articulation with a tractor;
    a main board (12) slidably connected to an interior of the external skeleton (1), and a seeding unit (2) is provided under the main board (12);
    a support frame (13) fixedly connected to the main board (12), wherein a bottom of the support frame (13) is rotatably connected with a plow blade (14) for slotting land;
    a rotary roller (15) provided below the external skeleton (1) and rotationally connected thereto;
    wherein the seeding unit (2) comprises a seeding box (21), which is fixedly connected to the external skeleton (1), a bottom of the seeding box (21) is penetrated and extends out of and is fixedly connected with a channel (22), and a bottom of the channel (22) is fixedly connected to a fixed barrel (23), the fixed barrel (23) is rotatably connected with a quantitative barrel (24); the quantitative barrel (24) is provided with quantitative grooves (25) in a circular and equally spaced manner;
    an inner wall of the quantitative barrel (24) is provided with a fixed tube (5), which is fixedly connected to an inner wall of the fixed barrel (23); a sponge sleeve (53) is provided between the fixed tube (5) and the quantitative barrel (24), and an inner wall of the sponge sleeve (53) is fixedly connected with multiple liquid guide strips (54) in a circular and equally spaced manner; the liquid guide strips (54) are penetrated and extend out of a side wall of the fixed tube (5) and is flexibly connected thereto;
    an inner wall of the quantitative groove (25) is movably connected with an extrusion strip (6), and one end of the quantitative barrel (24) is fixedly connected with a fixed disc (61); the fixed disc (61) is provided with multiple chutes (62), and the extrusion strip (6) is penetrated and extends out of each chute (62) and is slidably connected thereto; the fixed disc (61) is fixedly connected with multiple fixed blocks (63) corresponding to each chute (62), and the fixed blocks (63) are fixedly connected with a support spring (64), the support spring (64) is fixedly connected to the extrusion strip (6).

2. The sowing device according to claim 1, wherein a bottom of the fixed barrel (23) is connected with a leakage tube (3), a bottom of the main board (12) is fixedly connected with a seeding frame (31), the leakage tribe (3) runs through the seeding frame (31) and is slidably connected thereto; two symmetrically arranged soil guide discs (32) are rotationally connected within the seeding frame (31), and the two symmetrically arranged soil guide discs (32) are arranged in an inclined direction towards each other; one side of the seeding frame (31) is fixedly connected with a soil pushing plate (33), and the leakage tube (3) is located at an area between the soil guide disc (32) and the soil pushing plate (33) on the seeding frame (31).

3. The sowing device according to claim 2, wherein a seed pressing roller (4) is rotatably connected between two soil guide discs (32).

4. The sowing device according to claim 3, wherein the external skeleton (1) is fixedly connected with a cylinder (7), and a bottom of the cylinder (7) is provided with a retractable air rod (71), and a lower end of the air rod (71) is fixedly connected to the main board (12).

5. The sowing device according to claim 4, wherein the external skeleton (1) is fixedly connected with a fertilizer box (8), a bottom of the fertilizer box (8) is provided with an outlet (81), the main board (12) is penetrated and extends out of and is fixedly connected with a conduit (82) corresponding to the outlet (81), and the conduit (82) is located between the plow blade (14) and the soil pushing plate (33).

6. The sowing device according to claim 5, whereon a side wall of the outlet (81) is provided with a chute, the chute extends through and is slidably connected with a sliding plate (91), a bottom of the sliding plate (91) is fixedly connected with a horizontal plate (9), an L-shaped toothed plate (93) is provided below the horizontal plate (9), and a control box (92) is fixedly connected to the external skeleton (1), the L-shaped toothed plate (93) penetrates into the control box (92) and is slidably connected thereto; one end of the L-shaped toothed plate (93) that penetrates into the control box (92) is meshed connection with a gear, which rotates and is connected in the control box (92); the gear is meshed and connected with a straight toothed plate (94), and a lower end of the straight toothed plate (94) is penetrated and extends out of the main board (12) and is slidably connected thereto, a lower end of the straight toothed plate (94) is fixedly connected to the main board (12).

7. The sowing device according to claim 6, wherein the rotary roller (15) is penetrated and extends out and is rotationally connected with a soil spreading roller (100), the external skeleton (1) is provided with an anti-splash plate (101) at one end of the external skeleton near the soil spreading roller (100), and a conveyor belt (26) is connected between the soil spreading roller (100) and the quantitative barrel (24).

* * * * *